No. 748,357. PATENTED DEC. 29, 1903.
E. W. EVANS.
GOVERNOR.
APPLICATION FILED MAY 6, 1903.
NO MODEL.
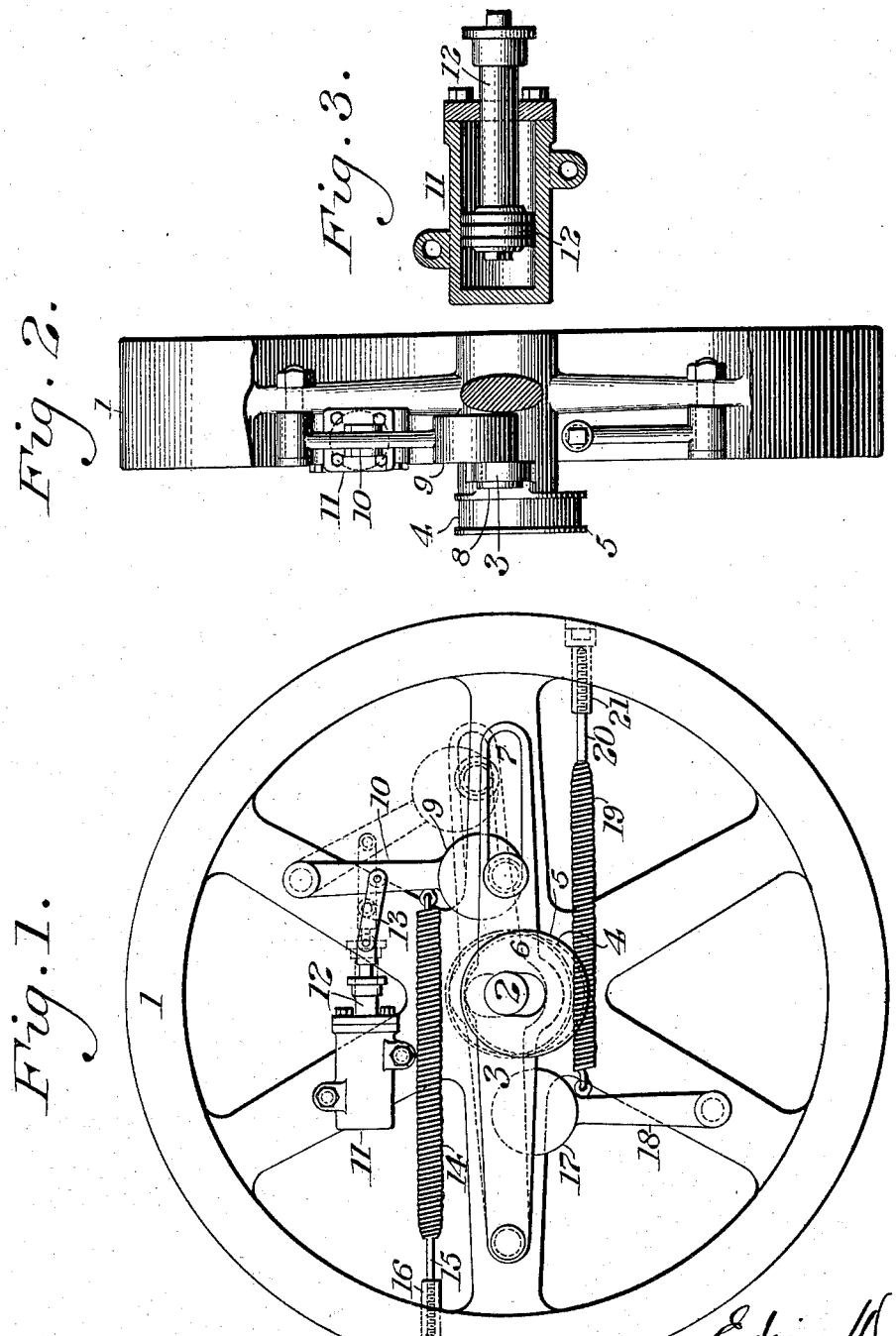
Witnesses
Inventor
Edwin W. Evans.
By
Wiedersheim & Fairbanks.
Attorneys No. 748,357.  Patented December 29, 1903.

UNITED STATES PATENT OFFICE.

EDWIN W. EVANS, OF PHILADELPHIA, PENNSYLVANIA, ASSIGNOR TO EDWARD H. GODSHALK, OF PHILADELPHIA, PENNSYLVANIA.

GOVERNOR.

SPECIFICATION forming part of Letters Patent No. 748,357, dated December 29, 1903.

Application filed May 6, 1903. Serial No. 155,797. (No model.)

*To all whom it may concern:*

Be it known that I, EDWIN W. EVANS, a citizen of the United States, residing in the city and county of Philadelphia, State of Pennsylvania, have invented a new and useful Improvement in Governors, of which the following is a specification.

My invention relates to a speed-governor for rotary engines.

It consists of an automatic throttling device applied to the fly-wheel of an engine.

It further consists of novel details of construction, all as will be hereinafter set forth.

Figure 1 represents a front elevation of the fly-wheel of an engine to which is applied my device. Fig. 2 represents a side elevation thereof, partly broken away. Fig. 3 represents, partly in elevation and partly in section, the retarding portion of my device detached.

Similar numerals of reference indicate corresponding parts in the figures.

Referring to the drawings, 1 designates a fly-wheel, of which 2 is the shaft. Pivotally secured to the wheel 1 and at a considerable distance from the shaft 2 is a bar 3, intermediate of which is a flat cylindric portion 4, preferably formed with flanges 5 and pierced by an oblong aperture 6, through which passes the shaft 2. In the free end of the bar 2 is a longitudinal slot 7, in which plays a stud 8, attached to a ball-weight 9. The weight 9 is supported by a lever 10, pivoted to the wheel. Also secured to the wheel is a cylinder 11, in which reciprocates a piston 12, the free end of the piston being connected by means of a link 13 with the lever 10. A pull-string 14 leads from the lever 10 and has at its rear end a bolt 15, engaging with a nut 16, swiveled on the wheel 1. A ball 17, lever 18, spring 19, bolt 20, and nut 21, similar to the corresponding parts already described, are placed in rotatable symmetry therewith on the wheel 1.

The operation is as follows: It is to be understood that the cylindric rod-attaching portion 4 is an actuating-eccentric to be connected by means of a strap and rod (not shown in the drawings) to a throttle or any convenient means, as a valve, for varying the supply of a liquid in accordance with the speed of the wheel 1. When the wheel 1 is slowly rotated, the spring 14 holds the weight 9 to the position shown in full lines, Fig. 1. The cylinder 4 is then eccentric to the shaft 2, and the reciprocation of the connecting-rod will be extreme. As the speed of the wheel 1 increases centrifugal force acting on the weight 9 draws the free end of the bar 3 toward the position shown in dotted lines, Fig. 1. At the point shown the cylinder 4 is concentric with the axis of the wheel 1, and no motion is communicated to the valve through the connecting-rod. It is evident that an adjustment of the pull of the spring 14 by means of the nut 16 will give to the wheel 1 any desired normal speed. Movement of the weight 9 in either direction is resisted by the piston 12 reciprocating in the cylinder or "dash-pot" 11, whereby too rapid or violent movements of the connected valve are prevented.

By pivoting the bar 3 at a distance from the center of rotation the throw of the eccentric relative to the centrifugal movement of the weight 9 is reduced, whereby great accuracy of the adjustment of the valve is produced by the simple mechanism shown.

It is clear that the function of the weight 17 and connected parts is merely to maintain the balance of the fly-wheel 1. Any desired means—*e. g.*, an additional tightening of the bolt on which the lever 18 is pivoted—may be provided to afford a resistance equal and similar to that of the piston 12.

Having thus described my invention, what I claim as new, and desire to secure by Letters Patent, is—

1. In a speed-governor adapted to be secured to a wheel of a machine, a rod-connecting portion adjacent to the axis of said wheel, brake-resisted centrifugal means for automatically adjusting the eccentricity of said rod-connecting portion and automatic means for maintaining the balance of said wheel.

2. A speed-governor adapted to be secured to a wheel of a machine, comprising a pivoted bar, a rod-connecting portion on said bar and adjacent the axis of such wheel, a pivoted weight operatively connected to said bar and adapted to vary the eccentricity of said rod-connecting portion, a brake device operatively connected with said weight and automatic means for maintaining the balance of said wheel.

3. A speed-governor adapted to be secured to a wheel of a machine comprising a pivoted bar, a rod-connecting portion on said bar and adjacent the axis of such wheel, a pivoted weight connected to said bar and operative to vary the eccentricity of said rod-connecting portion, a dash-pot brake having link connection with said pivoted weight and a second pivoted weight automatically operative for maintaining the balance of said wheel.

4. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel approximately at a right angle with the slotted portion of said bar, a centrifugally-operative weight on said lever, a stud on said lever longitudinally movable in said slot and centrifugal means for maintaining the balance of said wheel.

5. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel approximately at a right angle with the slotted portion of said bar, a centrifugally-operative weight on said lever, a stud on said lever longitudinally movable in said slot, a centripetally-operative spring connected with said lever and centrifugal means for maintaining the balance of said wheel.

6. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel aproximately at a right angle with the slotted portion of said bar, a centrifugally-operative weight on said lever, a stud on said lever longitudinally movable in said slot and a manually-adjustable centripetally-operative spring connected with said lever.

7. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel approximately at a right angle with the slotted portion of said bar, a centrifugally-operative weight on said lever, a stud on said lever longitudinally movable in said slot and a brake operatively connected with said lever.

8. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel approximately at a right angle with the slotted portion of said bar, a centrifugally-operative weight on said lever and a fluid-pressure braking device operatively connected with said lever.

9. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel approximately at a right angle with the slotted portion of said bar, a centrifugally-operative weight on said lever and a similar lever carrying a like weight idly pivoted to said wheel diametrically opposite said bar-engaging lever.

10. A speed-governor adapted to be secured to a wheel of a machine comprising a bar pivoted to said wheel at a substantial distance from its shaft having a cylindric strap-engaging portion slotted to pass said shaft and a slotted extension beyond said cylindric portion, a lever pivoted to said wheel approximately at a right angle with the slotted portion of said bar, a centrifugally-operative weight on said lever and a similar spring-retarded lever carrying a like weight idly pivoted to said wheel diametrically opposite said bar-engaging lever.

EDWIN W. EVANS.

Witnesses:
JOHN A. WIEDERSHEIM,
GEO. L. COOPER.